(12) United States Patent
Kumazawa (10) Patent No.: US 12,265,415 B2
(45) Date of Patent: Apr. 1, 2025

(54) MODERATION FEELING ADDING APPARATUS

(71) Applicant: NIHON PLAST CO., LTD., Fujinomiya (JP)

(72) Inventor: Tomoyoshi Kumazawa, Shizuoka (JP)

(73) Assignee: NIHON PLAST CO., LTD., Fujinomiya (JP)

(*) Notice: Subject to any disclaimer, the term of this patent is extended or adjusted under 35 U.S.C. 154(b) by 0 days.

(21) Appl. No.: 18/243,119

(22) Filed: Sep. 7, 2023

(65) Prior Publication Data
US 2024/0085936 A1 Mar. 14, 2024

(30) Foreign Application Priority Data
Sep. 9, 2022 (JP) .................. 2022-143517

(51) Int. Cl.
*G05G 5/03* (2008.04)

(52) U.S. Cl.
CPC .................. *G05G 5/03* (2013.01)

(58) Field of Classification Search
CPC ...... G05G 5/06; G05G 5/065; G05G 2505/00; G05G 5/18; G05G 5/24; G05G 5/03; H01H 19/11
USPC ............................................. 74/10.41
See application file for complete search history.

(56) References Cited

U.S. PATENT DOCUMENTS

| 11,907,002 B2* | 2/2024 | Hayasaka ............ B60H 1/3414 |
| 2004/0149073 A1* | 8/2004 | Ruegenberg ......... B60Q 1/1469 74/527 |
| 2012/0279841 A1* | 11/2012 | Nakajima .............. H01H 19/11 200/564 |
| 2012/0304802 A1* | 12/2012 | Wall ........................ G05G 1/08 74/527 |

FOREIGN PATENT DOCUMENTS

| DE | 4141110 A1 * | 6/1993 | ............... G05G 5/06 |
| JP | 2001-035306 | 2/2001 | |
| WO | WO-02093604 A1 * | 11/2002 | ........... B60Q 1/1469 |
| WO | WO-2011064953 A1 * | 6/2011 | ............ H01H 19/11 |

OTHER PUBLICATIONS

USPTO Machine Translation (retrieved from FIT database) of DE 4141110 A1, Bauer, Jun. 17, 1993. (Year: 2023) (Year: 2024).*

* cited by examiner

*Primary Examiner* — Daniel D Yabut
(74) *Attorney, Agent, or Firm* — Amin, Turocy & Watson, LLP (57) ABSTRACT

An apparatus that adds a favorable moderation feeling is provided. Base section 17 operates to one and other sides in a direction. Contact section 43 attached to spring 42 can be in contact with base section 17. Holding section 48 holds spring 42. Wall portion 47a faces contact section 43 in the direction, and generates a sound by a collision between wall portion 47a and contact section 43 moved by a biasing force of spring 42 as a contact state between contact section 43 and base section 17 changes due to an operation of base section 17. A limiting section limits a movable range of (Continued)

contact section 43 along the direction. Holding section 48 regulates a position of spring 42 in the direction. Clearance CL between contact section 43 and wall portion 47*a* is substantially equal between the one and other sides in the direction.

6 Claims, 4 Drawing Sheets

MODERATION FEELING ADDING APPARATUS

CROSS REFERENCE TO RELATED APPLICATIONS

This application is entitled to and claims the benefit of Japanese Patent Application No. 2022-143517 filed on Sep. 9, 2022, the disclosure of which including the specification, drawings and abstract is incorporated herein by reference in its entirety.

TECHNICAL FIELD

The present invention relates to a moderation feeling adding apparatus that adds a moderation feeling.

BACKGROUND ART

In the related art, an operation dial for setting an operation of a wind direction adjusting apparatus may be provided to adjust a wind direction of an air conditioning apparatus used for a vehicle such as an automobile. When the operation dial is operated at a predetermined location designating the operation of the wind direction adjusting apparatus, it is possible to improve an operation feeling by adding a moderation feeling, that is, a clicking feeling.

As a moderation feeling adding apparatus for adding the moderation feeling to the operation dial, an apparatus equipped with a plunger having a spring arranged in a radial direction of rotation of the operation dial and a pin arranged at a distal end of the spring is known. In this apparatus, when the operation dial is operated at a predetermined location, the pin aligns with a groove portion formed in a support member that supports the operation dial, and the pin hits the support member by a biasing force of the spring. Therefore, a striking sound, that is, a moderation sound (click sound) is generated (see, for example, PTL 1).

CITATION LIST

Patent Literature

PTL 1

Japanese Patent Application Laid-Open No. 2001-35306 (Pages 3 and 4 and FIGS. 1 to 5)

SUMMARY OF INVENTION

Technical Problem

However, in the above-mentioned moderation feeling adding apparatus, a clearance between a holding hole of the plunger and the plunger is reduced in order to support the spring so that the spring does not shift laterally due to sliding contact between the pin and the support member when the operation dial is rotated. Therefore, a diameter of the holding hole of the plunger is small, it is difficult to insert the plunger into the holding hole, and thus, it is not easy to assemble.

In addition, in a case where a diameter dimension of the holding hole is set larger than an external shape of the plunger in consideration of ease of assembly, when the operation dial is operated, the spring is twisted in an unintended direction (inner wall surface side of hole portion on a side in direction which intersects sliding direction of operation dial), and thus, insufficient biasing may result in failure to obtain an expected striking sound.

The present invention has been made in view of such a point, and an object of the present invention is to provide a moderation feeling adding apparatus that is easy to assemble and can add a favorable moderation feeling.

Solution to Problem

According to a first aspect, there is provided a moderation feeling adding apparatus including: an operation section that operates to one side and the other side in a predetermined direction; a spring; a contact section that is attached to the spring and capable of being in contact with the operation section; a holding section that holds the spring; a wall portion that faces the contact section in the predetermined direction and generates a sound which becomes a moderation feeling by a collision between the wall portion and the contact section moved by a biasing force of the spring as a contact state between the contact section and the operation section changes due to an operation of the operation section; and a limiting section that limits a movable range of the contact section to a range along the predetermined direction, in which the holding section regulates a position of the spring at least in the predetermined direction, and a clearance between the contact section and the wall portion is substantially equal between the one side and the other side in the predetermined direction.

In the moderation feeling adding apparatus according to a second aspect, in the moderation feeling adding apparatus according to the first aspect, the wall portion is a portion of a side wall of a hole portion in which the spring and the contact section are arranged, and the holding section holds the spring in a substantially central portion of the hole portion.

In the moderation feeling adding apparatus according to a third aspect, in the moderation feeling adding apparatus according to the first or second aspect, the holding section is a recessed portion into which an end portion of the spring is inserted.

In the moderation feeling adding apparatus according to a fourth aspect, in the moderation feeling adding apparatus according to the third aspect, an opening side of the recessed portion is widened in a tapered shape toward a wall portion side.

Advantageous Effects of Invention

According to the moderation feeling adding apparatus of the first aspect, while it is not necessary to bring the wall portion close to the spring and the contact section in order to hold the spring, an assembling space can be secured and assembling is easy. In addition, since a movement stroke of the contact section when the operation section operates to the one side in the predetermined direction becomes substantially equal to a movement stroke when the operation section operates to the other side and the limiting section limits the movable range of the contact section to the range along the predetermined direction, twisting of the spring in an unintended direction can be suppressed. Therefore, in a sound which becomes a moderation feeling generated when the contact section collides with the wall portion, the sounds when the operation section operates to the one side and the other side in the predetermined direction can be substantially uniform, and it is not necessary to bring the wall portion close to the contact section. Accordingly, it is possible to secure a stroke in the predetermined direction when the contact section collides with the wall portion and generate a loud sound, so that a favorable moderation feeling can be added.

According to the moderation feeling adding apparatus of the second aspect, in addition to the effect of the moderation feeling adding apparatus according to the first aspect, the clearance between the contact section and the wall portion can be easily set substantially equal between the one side and the other side in the predetermined direction which is an operating direction of the operation section.

According to the moderation feeling adding apparatus of the third aspect, in addition to the effect of the moderation feeling adding apparatus according to the first or second aspect, the spring can be easily assembled by simply inserting the end portion of the spring into the holding section.

According to the moderation feeling adding apparatus of the fourth aspect, in addition to the effect of the moderation feeling adding apparatus according to the third aspect, when the spring is attached to be held in the recessed portion, a tapered shape on an opening side of the recessed portion serves as a guide, and thus, the spring can be assembled more easily.

DESCRIPTION OF EMBODIMENTS

Hereinafter, a first embodiment of the present invention will be described with reference to the drawings.

Figure 5:
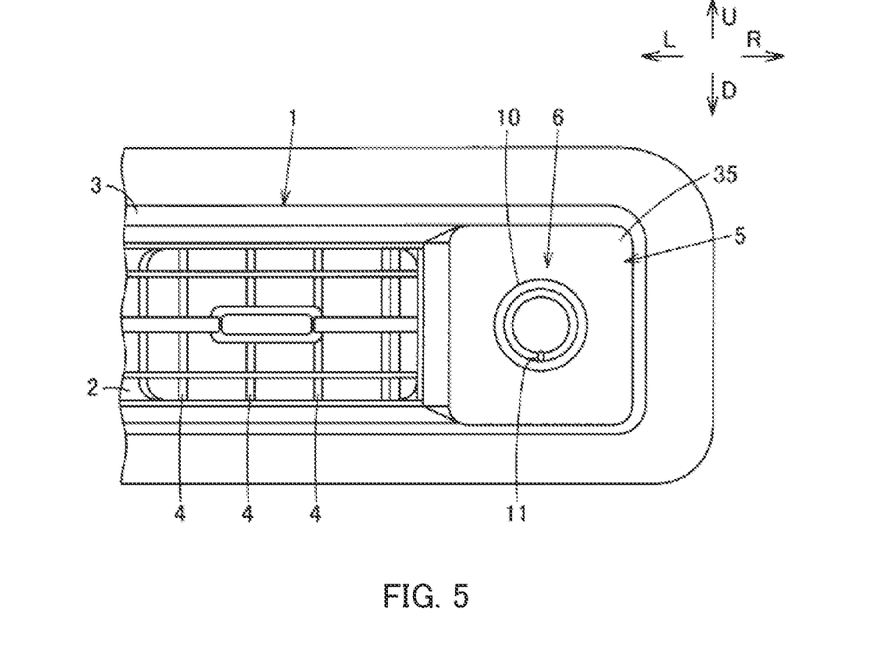
FIG. 5 is a perspective view showing an example of the operation apparatus.

In FIG. 5, a reference numeral 1 denotes a wind direction adjusting apparatus as an apparatus to be operated. Wind direction adjusting apparatus 1 is also called an air conditioning wind blowing apparatus, an air outlet, a ventilator, a register, or the like, and adjusts a wind direction to be blown in an air conditioning apparatus used for a vehicle such as an automobile. For example, wind direction adjusting apparatus 1 is installed in each part of the vehicle such as an instrument panel part and a center console part. In the present embodiment, wind direction adjusting apparatus 1 is arranged in front of an occupant in a vehicle interior as an example, and with reference to a direction seen from the vehicle interior, arrow FR (FIG. 1A or the like) side is referred to as a front side, arrow RR (FIG. 1A or the like) side is referred to as a rear side, arrow L side is referred to as a left side, arrow R side is referred to as a right side, arrow U side is referred to as an upper side, and arrow D side is referred to as a lower side. These directions are shown as an example only, and may be appropriately changed depending on an installation position and an installation direction of wind direction adjusting apparatus 1.

Wind direction adjusting apparatus 1 includes main body portion 3 having outlet 2 for blowing out air-conditioned wind. In the present embodiment, outlet 2 is formed laterally and is narrower in an up-down direction than in a right-left direction. Fin 4 which is a wind direction adjusting body is rotatably supported on main body portion 3 to face outlet 2. In the present embodiment, for example, fin 4 includes a vertical fin that has an axial direction in the up-down direction and is rotatably supported by main body portion 3, and a horizontal fin that has an axial direction in the right-left direction and is rotatably supported by main body portion 3. The number and arrangement of fins 4 may be arbitrarily set. In addition, wind direction adjusting apparatus 1 includes a moving section such as a shut valve.

In wind direction adjusting apparatus 1, the operation of the moving section is set by operation apparatus 5 operated by an operator such as the occupant. For example, in wind direction adjusting apparatus 1, wind distribution performance is set by operation apparatus 5. Operation apparatus 5 is arranged adjacent to wind direction adjusting apparatus 1. In the present embodiment, operation apparatus 5 is arranged on the right side of wind direction adjusting apparatus 1.

Figure 4:
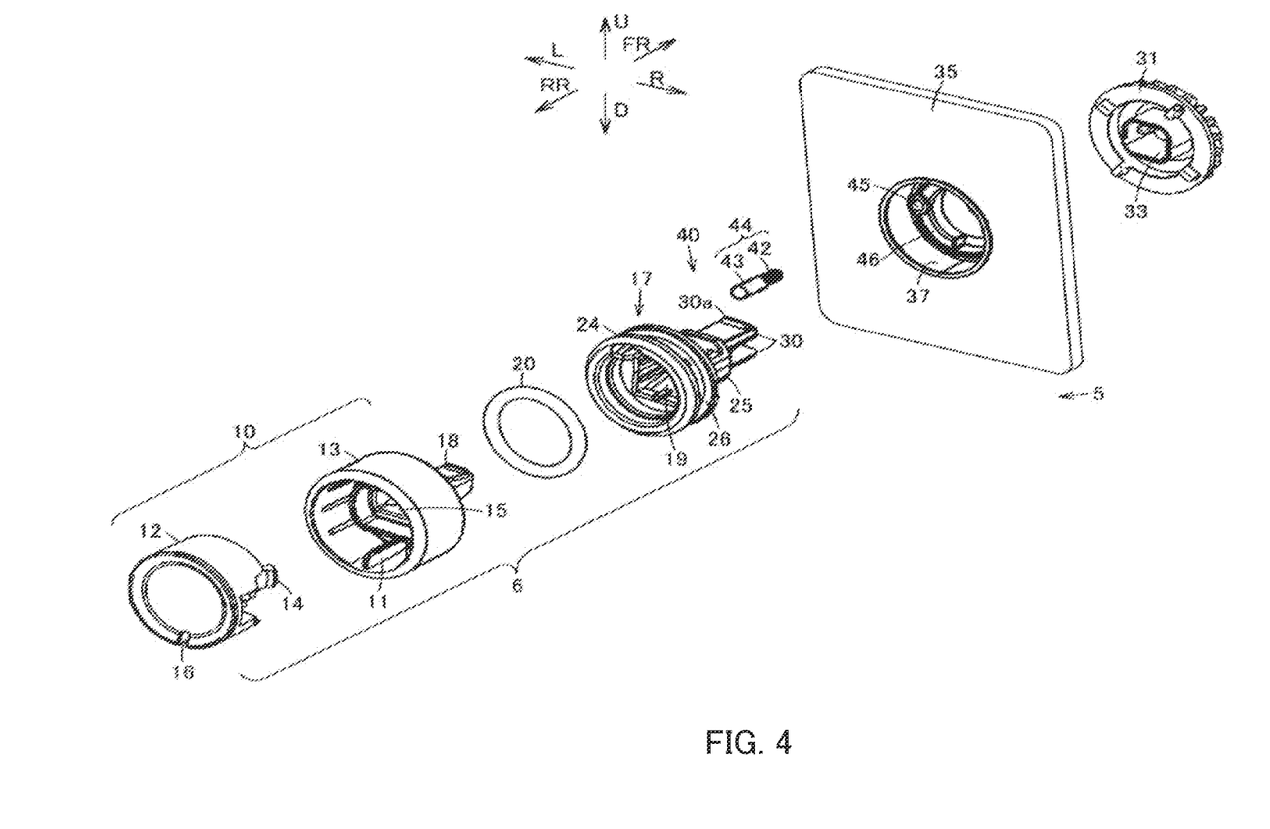
FIG. 4 is an exploded perspective view of an operation apparatus including the moderation feeling adding apparatus.

As shown in FIG. 4, operation apparatus 5 has operated section 6 operated by a user. Operated section 6 is a section that operates according to the operation of the user. In the present embodiment, operated section 6 is a dial. That is, operated section 6 of the present embodiment is rotated by the user. Further, shown operated section 6 is an operation section that rotates according to the operation of the user. That is, operated section 6 can be rotated between one side and the other side in a circumferential direction, which is a predetermined direction, by the operation. In the present embodiment, operated section 6 has a rotation shaft along a front-rear direction, and can rotate around the rotation shaft in a clockwise direction which is the one side and in a counterclockwise direction which is the other side.

Operated section 6 has knob section 10 to be picked or grasped by the user. Preferably, knob section 10 is formed with mark section 11 indicating an operation position or a designated position of operated section 6. In the shown example, knob section 10 is formed in a circular shape when viewed from the front, and mark section 11 is arranged along a radial direction thereof.

In the present embodiment, knob section 10 includes one knob member 12 and other knob member 13.

One knob member 12 constitutes a design portion of knob section 10. One knob member 12 is formed in a covered cylindrical shape, and is arranged so that a lid portion is located at a rear end portion.

Further, other knob member 13 constitutes an outer shell portion or an outer peripheral portion of one knob member 12. Other knob member 13 is formed in a cylindrical shape, and one knob member 12 is inserted and attached from the rear to the inside. In the present embodiment, claw portion 14 protrudes from a front portion of one knob member 12, claw portion 14 is inserted into and hooked into insertion hole portion 15 formed in other knob member 13, and thus, one knob member 12 and other knob member 13 are integrally connected. Further, in the present embodiment, mark section 11 is formed as a rib along the radial direction and the axial direction on an inner peripheral portion of other knob member 13, mark section 11 is fitted into groove portion 16 formed on the lid portion of one knob member 12, and thus, one knob member 12 and other knob member 13 are aligned with each other, and one knob member 12 is prevented from rotating with respect to other knob member 13.

Base section 17, which is an operation section, is connected to knob section 10. Connection portion 18 protrudes from a front portion of other knob member 13 in knob section 10, connection portion 18 is inserted into and hooked to receiving portion 19 formed in base section 17, and thus, knob section 10 and base section 17 are integrally connected. Cushioning member 20 may be attached to base section 17. Cushioning member 20 has elasticity and absorbs rattling during rotation of operated section 6 to improve an operation feeling. As cushioning member 20, for example, an O-ring is used.

Figure 3:
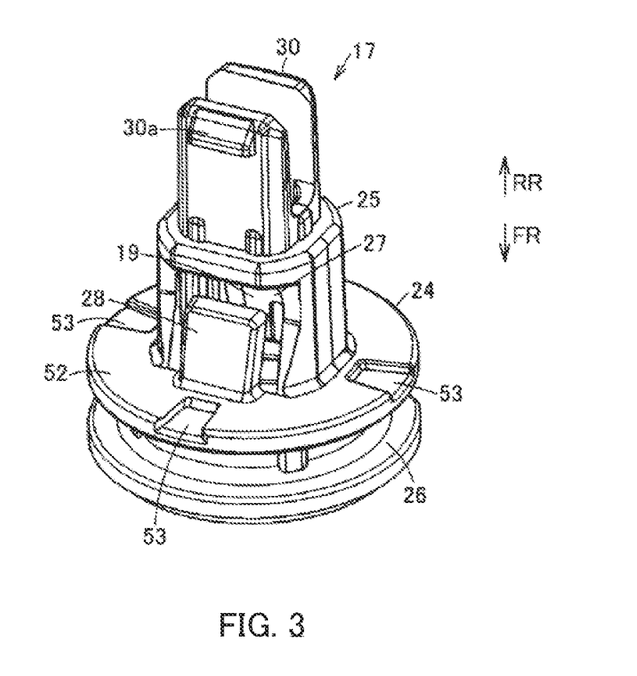
FIG. 3 is a perspective view showing a portion of the moderation feeling adding apparatus.

Base section 17 is a section that is operated, that is, moved or rotated by the operation of operated section 6. In the present embodiment, base section 17 can be operated to the one side and the other side in a circumferential direction (rotational direction) which is a predetermined direction, that is, in the clockwise direction and the counterclockwise direction, in accordance with the operation of operated section 6. As shown in FIGS. 3 and 4, base section 17 has base section main body portion 24 and protruding portion 25 formed in base section main body portion 24.

In the present embodiment, base section main body portion 24 is formed in a cylindrical shape. Protruding portion 25 is coaxially arranged on the front side of base section main body portion 24, and protrudes forward from base section main body portion 24. Receiving portion 19 is formed over base section main body portion 24 and protruding portion 25. Mounting groove portion 26 for receiving cushioning member 20 is formed on an outer peripheral portion of base section main body portion 24 forming an outer peripheral portion of base section 17. Notch hole portion 27 is formed on a side portion of protruding portion 25, and hooking portion 28 on which connection portion 18 of knob section 10 is hooked is formed at notch hole portion 27.

Further, in the present embodiment, base section 17 further has coupling section 30. Coupling section 30 is coupled to conversion section 31 for transmitting the operation of operated section 6 to the moving section such as a shut valve of wind direction adjusting apparatus 1. Coupling section 30 is formed to protrude forward from a front portion of protruding portion 25. In the shown example, coupling section 30 is formed in the shape of two plates parallel to each other, and coupling claw section 30a is formed at a distal end portion of coupling section 30.

Conversion section 31 is a section that converts the operation of operated section 6 into power for operating the moving section of wind direction adjusting apparatus 1. Conversion section 31 is, for example, a gear meshed with a mechanism for operating the moving section of wind direction adjusting apparatus 1. In the present embodiment, conversion section 31 is a bevel gear. In a central portion of conversion section 31, coupling receiving section 33 into which coupling section 30 is inserted and coupling claw section 30a is hooked is formed.

Conversion section 31 and operated section 6 are movably supported by support section 35. Support section 35 supports operated section 6 on the vehicle interior side, that is, the rear side which is the design side, and supports conversion section 31 on the front side which is the opposite side thereof. As shown in FIG. 5, support section 35 is a design panel fixed to the vehicle body side, and constitutes a design surface adjacent to wind direction adjusting apparatus 1. Further, as shown in FIG. 4, support section 35 is formed with opening portion 37 penetrating in the front-rear direction. Operated section 6 is inserted into opening portion 37 from the rear, and operated section 6 is coupled to conversion section 31 on the front side, which is a rear surface side of support section 35. In the present embodiment, base section 17 of operated section 6 is inserted into opening portion 37, and knob section 10 is configured to be exposed and protrude rearward with respect to support section 35. Further, in the present embodiment, cushioning member 20 is in sliding contact with opening portion 37 as operated section 6 is operated.

Support section 35 may be printed or stamped with a mark indicating the operation of the moving section at a position designated by mark section 11 located on knob section 10 of exposed operated section 6. The mark is arranged on the design surface of support section 35, that is, on the outer side of opening portion 37. For example, the mark includes a scale, a numerical value, a pictogram, and the like.

Then, in the present embodiment, moderation feeling adding apparatus 40 that causes a moderation feeling (clicking feeling) is attached between support section 35 and operated section 6. Shown moderation feeling adding apparatus 40 generates a moderation feeling according to the position of knob section 10 or mark section 11 when operated section 6 is operated. For example, moderation feeling adding apparatus 40 generates the moderation feeling when knob section 10 or mark section 11 during operation of operated section 6 is moved to a predetermined designated position. Moderation feeling adding apparatus 40 has plunger 44 including spring 42 and contact section 43 attached to spring 42.

Spring 42 is a coil spring in which a wire rod is wound in a coil shape. Contact section 43 is located on one end portion side of spring 42 and is biased by spring 42. Contact section 43 is formed of a member having a predetermined rigidity, such as metal or synthetic resin. Then, plunger 44 is arranged in hole portion 45 formed in support section 35, and is located to face the front portion of operated section 6.

Hole portion 45 is formed in support wall portion 46 protruding inside opening portion 37 of support section 35. Hole portion 45 is formed in the front-rear direction, a rear portion thereof is opened, and a front portion thereof is closed. As shown in FIGS. 1A to 1C and 2, side wall 47 of hole portion 45 is formed to extend in the front-rear direction. Therefore, spring 42 and contact section 43, that is, plunger 44 is arranged to extend in the front-rear direction intersecting the operating direction of base section 17, and is parallel to or substantially parallel to the rotation shaft of base section 17. In the present embodiment, hole portion 45 is formed in a circular shape when viewed from the front. Therefore, side wall 47 has a cylindrical shape. Side wall 47 is a portion forming a portion of support wall portion 46.

Figure 2:
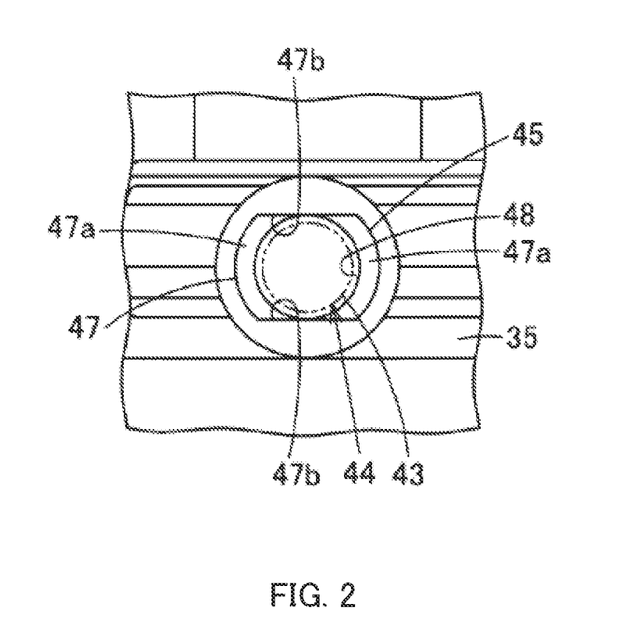
FIG. 2 is a plan view showing a portion of the moderation feeling adding apparatus as viewed in a direction intersecting the predetermined direction.

Side wall 47 integrally includes wall portions 47a located on one side and the other side in the predetermined direction that is the right-left direction in the drawing, that is, the operating direction of base section 17, and limiting sections 47b located on one side and the other side in another direction that intersects or is orthogonal to the predetermined direction.

Wall portion 47a is a portion that generates a striking sound when wall portion 47a collides with contact section 43. Wall portion 47a has a planar shape that curves along an outer shape of contact section 43. In the present embodiment, wall portion 47a is curved in a semi-cylindrical surface. Wall portion 47a is located in the right-left direction with respect to contact section 43 located inside hole portion 45. Wall portions 47a and 47a are located on the same circumference when viewed in the front-rear direction. That is, wall portions 47a and 47a are semi-cylindrical surfaces having the same axis.

Limiting section 47b is a portion that limits a movable range of contact section 43 to a range along a predetermined direction. In the present embodiment, limiting section 47b is a portion that narrows the movable range of contact section 43 in the direction intersecting or orthogonal to a predetermined direction, that is, in the up-down direction in FIG. 2. Limiting section 47b has a planar shape extending in the right-left direction between wall portions 47a and 47a. Limiting section 47b is located inside the imaginary extension surface of wall portion 47a. In the present embodiment, limiting section 47b is formed in a planar shape. Limiting sections 47b and 47b are arranged parallel or substantially parallel to each other. Therefore, hole portion 45 has a shape that is long in the right-left direction and short in the up-down direction.

Further, inside hole portion 45, holding section 48 for holding the other end portion side of spring 42, that is, the side opposite to contact section 43 is formed. Holding section 48 is formed on support wall portion 46 which is a bottom portion of hole portion 45, and is located at a substantially central portion of hole portion 45. Holding section 48 regulates the position of spring 42 in the radial direction of spring 42. That is, spring 42 held by holding section 48 is located without substantially changing the position of the held proximal end portion side. Therefore, spring 42 is held by holding section 48 so that the other end portion side thereof is held by the substantially central portion of hole portion 45. Accordingly, spring 42 is held so that the position of the other end portion side of spring 42 does not move to at least the right-left direction in FIGS. 1A to 1C, that is, the one side and the other side in the predetermined direction which is the operating direction of base section 17.

In the present embodiment, holding section 48 is a recessed portion. Holding section 48 is a recessed portion having a circular shape when viewed from the front, having an inner diameter dimension smaller than an inner diameter dimension of hole portion 45 and slightly larger than an outer diameter dimension of spring 42. Holding section 48 is arranged coaxially with hole portion 45. Holding section 48 holds the outer peripheral side of the other end portion of spring 42. A rear side of holding section 48, which is the opening side, is widened in a tapered shape toward wall portion 47a side. That is, on the opening side of holding section 48, tapered surface 48a having a conical surface whose diameter dimension gradually increases toward the rear side is formed. Tapered surface 48a is connected to side wall 47.

Figure 1A:
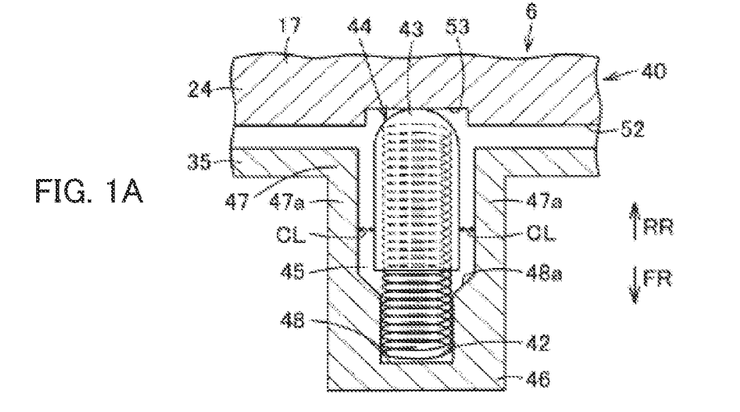
FIG. 1A is a cross-sectional view showing a moderation feeling adding apparatus according to a first embodiment of the present invention.
Figure 1B:
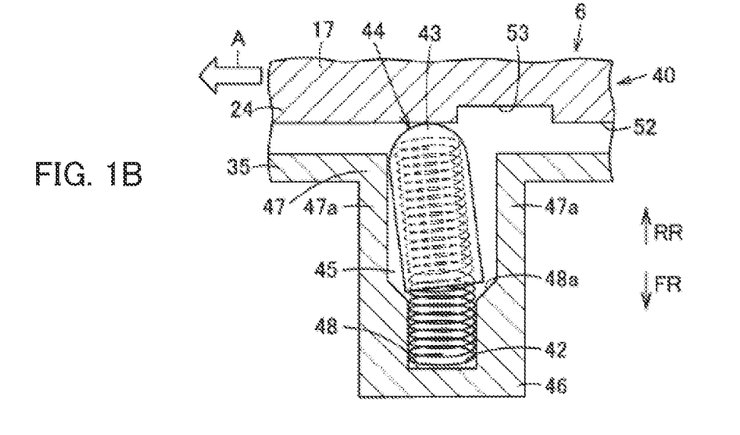
FIG. 1B is a cross-sectional view showing a state in which the operation section of the moderation feeling adding apparatus operates to one side in a predetermined direction.

One end portion side of spring 42 extends to the inside of hole portion 45 at a position where the other end portion side thereof is held by holding section 48. That is, at least one end portion side of spring 42 can be elastically curved in hole portion 45 in the radial direction. Further, contact section 43 attached to the one end portion side of spring 42 is located inside hole portion 45 at the position where the other end portion side of spring 42 is held by holding section 48. That is, the side portion of contact section 43 faces side wall 47 in the radial direction. As shown in FIG. 1A, wall portion 47a of side wall 47 has predetermined clearance CL with respect to contact section 43 in a state where spring 42 is not curved. That is, clearance CLs are substantially equal to each other in the right-left direction in FIG. 1A, that is, between the one side and the other side in the predetermined direction which is the operating direction of base section 17. Further, limiting section 47b of side wall 47 is located closer to contact section 43 than wall portion 47a in a state where spring 42 is not curved. Limiting section 47b may be in contact with contact section 43, but is preferably located slightly apart from contact section 43. More preferably, limiting sections 47b are set so that other limiting section 47b does not come into contact with contact section 43 at the position where contact section 43 is in contact with one limiting section 47b.

Further, the distal end portion of contact section 43, that is, the end portion on the side opposite to spring 42, protrudes rearward from hole portion 45 and faces operated section 6. In the present embodiment, the distal end portion of contact section 43 protrudes rearward from hole portion 45 and faces the front portion of base section main body portion 24 of base section 17 of operated section 6. As shown in FIGS. 1A and 3, the front portion of base section main body portion 24 is planar facing surface portion 52 which is a general surface portion, and concave groove portion 53 is formed in facing surface portion 52. Contact section 43 is elastically pressed against facing surface portion 52 of base section 17 by the biasing of spring 42.

Facing surface portion 52 faces support wall portion 46 in the front-rear direction with base section 17 of operated section 6 inserted into opening portion 37 of support section 35. Facing surface portion 52 is a surface extending in the predetermined direction, that is, the circumferential direction, which is the operating direction of base section 17 accompanying the operation of operated section 6. Further, facing surface portion 52 is a sliding contact section that is in sliding contact with contact section 43 when base section 17 is operated by the operation of operated section 6. Therefore, facing surface portion 52 is a biasing force accumulating section for storing the biasing force in spring 42 by sliding contact with contact section 43.

Concave groove portion 53 is a biasing force opening portion that releases at least a portion of the biasing force stored in spring 42 by sliding contact between facing surface portion 52 and contact section 43 by the operation of base section 17 by the operation of operated section 6. Concave groove portion 53 is formed by offsetting a portion of facing surface portion 52 rearward. Concave groove portion 53 is set according to the position designated by mark section 11 located on knob section 10 of operated section 6. In the present embodiment, plurality of concave groove portions 53, for example, three are formed. Further, in the example shown in FIG. 3, concave groove portions 53 are arranged at equal intervals or at equal angles in the circumferential direction which is the operating direction of base section 17 (FIG. 4).

Next, the operation of the first embodiment will be described.

When assembling moderation feeling adding apparatus 40, plunger 44 having contact section 43 attached to the end portion of spring 42 is inserted into hole portion 45 of support wall portion 46 located in opening portion 37 of support section 35, and the end portion of spring 42 opposite to contact section 43 is held by holding section 48. In this state, as shown in FIG. 1A, contact section 43 is located in the substantially central portion of hole portion 45 in a state where spring 42 is upright, and substantially constant clearance CL is formed between contact section 43 and wall portion 47a.

Next, operated section 6 configured by preliminarily assembling one knob member 12, other knob member 13, cushioning member 20, and base section 17 shown in FIG. 4 is assembled to opening portion 37 from the rear with respect to support section 35 in which plunger 44 is attached to hole portion 45, and conversion section 31 is coupled to coupling section 30 of operated section 6 from the front with support section 35 interposed therebetween.

In this state, as shown in FIG. 1A, base section 17 of operated section 6 faces contact section 43 in the front-rear direction, base section 17 and contact section 43 are in contact with each other at facing surface portion 52 or concave groove portion 53, and thus, moderation feeling adding apparatus 40 is configured, and operation apparatus 5 shown in FIG. 5 is assembled.

When setting the operation of wind direction adjusting apparatus 1, in a case where the user rotates knob section 10 of operated section 6 of operation apparatus 5, entire operated section 6 rotates, conversion section 31 (FIG. 4) coupled to operated section 6 is rotated in conjunction with operated section 6, and thus, the operation of operated section 6 is converted into the power for operating the moving section of wind direction adjusting apparatus 1 by conversion section 31 (FIG. 4), and wind direction adjusting apparatus 1 is driven by the set operation.

When operated section 6 is rotated, in moderation feeling adding apparatus 40 shown in FIG. 1A, contact section 43 is in sliding contact with facing surface portion 52. For example, when base section 17 is moved by the rotation of operated section 6 to the one side which is the left in the drawing, that is, in a direction indicated by arrow A in FIG. 1B, the distal end portion of contact section 43 is pressed toward arrow A side by the sliding contact between contact section 43 and facing surface portion 52, and the position of the other end portion side of spring 42 on arrow A side is regulated by holding section 48 and hardly moves. Accordingly, one end portion side of spring 42 is bent in the direction of arrow A in clearance CL with wall portion 47a of hole portion 45, and the biasing force is accumulated in spring 42. At this time, the position of contact section 43 is limited in a predetermined direction by limiting section 47b (FIG. 2), so that contact section 43 moves toward arrow A side without spring 42 being twisted. Then, for example, when operated section 6 reaches a predetermined position such as a position in which mark section 11 designates the operation of the moving section of wind direction adjusting apparatus 1, contact section 43 reaches the position of concave groove portion 53 of base section 17 set according to the predetermined position. Accordingly, at least a portion of the biasing force stored in spring 42 is released, and contact section 43 swings in the opposite direction to arrow A while being guided by sliding contact with one limiting section 47b (FIG. 2). As a result, contact section 43 moves toward wall portion 47a on the side opposite to arrow A side of hole portion 45 and collides with wall portion 47a, and a striking sound, that is, a moderation sound (click sound) is generated. Further, the position of operated section 6 is temporarily fixed at a predetermined position by the distal end portion side of contact section 43 entering concave groove portion 53.

Figure 1C:
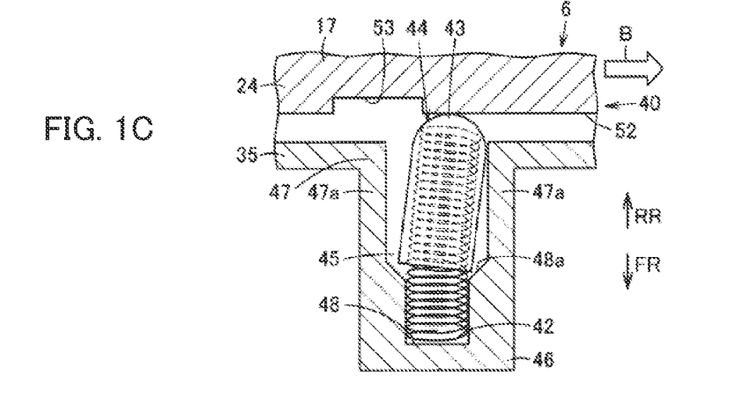
FIG. 1C is a cross-sectional view showing a state in which the operation section of the moderation feeling adding apparatus operates to the other side in the predetermined direction.

Similarly, when base section 17 is moved by the rotation of operated section 6 to the other side which is the right in the drawing, that is, in a direction indicated by arrow B in FIG. 1C, the distal end portion of contact section 43 is pressed toward arrow B side by the sliding contact between contact section 43 and facing surface portion 52, and the position of the other end portion side of spring 42 on arrow B side is regulated by holding section 48 and hardly moves. Accordingly, one end portion side of spring 42 is bent in the direction of arrow B in clearance CL with wall portion 47a of hole portion 45, and the biasing force is accumulated in spring 42. At this time, the position of contact section 43 is limited along the predetermined direction by limiting section 47b (FIG. 2), so that contact section 43 moves to arrow B side without spring 42 being twisted. Then, for example, when operated section 6 reaches the predetermined position such as the position in which mark section 11 designates the operation of the moving section of wind direction adjusting apparatus 1, contact section 43 reaches the position of concave groove portion 53 of base section 17 set according to the predetermined position. Accordingly, at least a portion of the biasing force stored in spring 42 is released, and contact section 43 swings in the direction opposite to arrow B while being guided by sliding contact with one limiting section 47b (FIG. 2). As a result, contact section 43 moves toward wall portion 47a on the side opposite to arrow B side of hole portion 45 and collides with wall portion 47a, and a striking sound, that is, a moderation sound (click sound) is generated. Further, the position of operated section 6 is temporarily fixed at a predetermined position by the distal end portion side of contact section 43 entering concave groove portion 53.

As described above, according to the first embodiment, in moderation feeling adding apparatus 40, at least the position of spring 42 on the one side and the other side in the predetermined direction (rotational direction) which is the operating direction of base section 17 is regulated by holding section 48. Therefore, while it is not necessary to bring wall portion 47a close to spring 42 and contact section 43 in order to hold spring 42, that is, it is not necessary to narrow hole portion 45 into which spring 42 and contact section 43 (plunger 44) are inserted, an assembling space can be secured and assembling is easy. Further, by setting limiting section 47b to have a slight clearance with respect to contact section 43, spring 42 and contact section 43 (plunger 44) are easily inserted into hole portion 45.

In addition, since clearance CL between contact section 43 and wall portion 47a is set to be substantially equal between one side and the other side in the predetermined direction (rotational direction) which is the operating direction of base section 17, a movement stroke of contact section 43 when base section 17 operates to the one side in the predetermined direction becomes substantially equal to a movement stroke when base section 17 operates to the other side, and in any of these operations, limiting section 47b can suppress twisting of spring 42 in an unintended direction, which leads to non-uniform striking sounds. Therefore, in a striking sound which becomes the moderation feeling generated when contact section 43 collides with wall portion 47a due to the release of the biasing force of spring 42 in a case where the contact state between contact section 43 and base section 17 changes, such as when contact section 43 moves relatively from facing surface portion 52 to concave groove portion 53, the striking sounds when base section 17 operates to the one side and the other side in the predetermined direction can be substantially uniform, and it is not necessary to bring wall portion 47a close to contact section 43. Accordingly, it is possible to secure a stroke when contact section 43 collides with wall portion 47a and generate a loud striking sound, so that a favorable moderation feeling can be added.

Wall portion 47a is used as a portion of side wall 47 of hole portion 45 accommodating contact section 43, and spring 42 is held in the substantially central portion of hole portion 45 by holding section 48. Accordingly, clearance CL between contact section 43 and wall portion 47a can be easily set substantially equal between the one side and the other side in the predetermined direction which is the operating direction of base section 17, which is the rotation direction in the present embodiment.

By forming limiting section 47b as another portion of side wall 47 of hole portion 45 that accommodates contact section 43, the movable range of contact section 43 can be easily limited to the range along a predetermined direction.

Holding section 48 is formed of a recessed portion into which the end portion of spring 42 is inserted, and thus, spring 42 can be easily assembled by simply inserting the end portion of spring 42 into holding section 48.

Since the opening side of holding section 48, which is a recessed portion, is widened in a tapered shape toward wall portion 47a, the tapered shape (tapered surface 48a) on the opening side of holding section 48 serves as a guide when spring 42 (plunger 44) is attached to be held by holding section 48, and thus, spring 42 (plunger 44) can be assembled more easily.

Further, when operated section 6 is operated by moderation feeling adding apparatus 40, the moderation feeling is generated at a predetermined position, and thus, the user can know the position of operated section 6 by the moderation feeling without directly visually observing operated section 6. Therefore, for example, the driver can operate operated section 6 without moving the line of sight.

Figure 6:
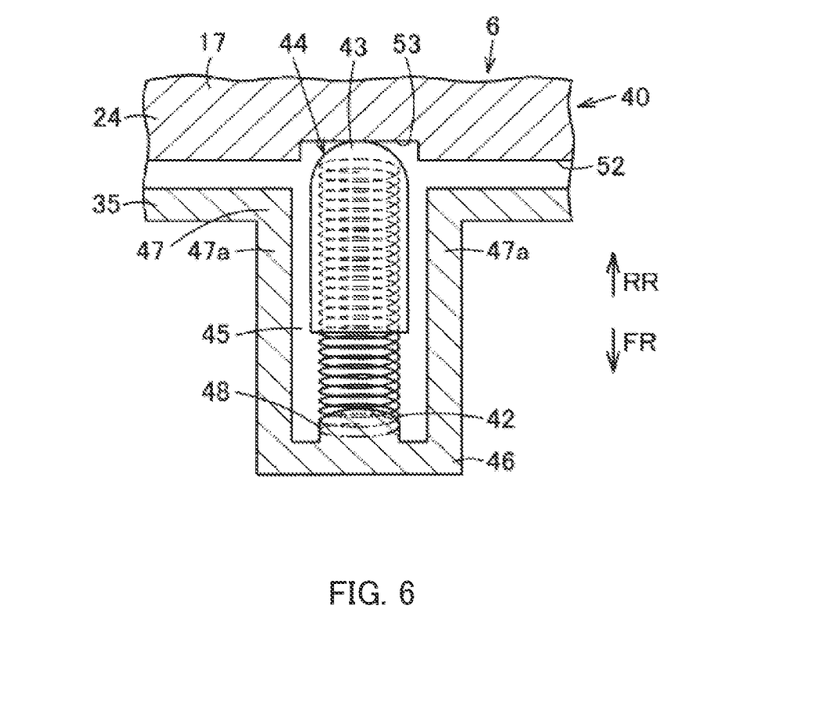
FIG. 6 is a cross-sectional view showing a moderation feeling adding apparatus according to a second embodiment of the present invention.

Next, a second embodiment will be described with reference to FIG. 6. The same components and operations as those of the first embodiment are designated by the same reference numerals, and the description thereof will be omitted.

In moderation feeling adding apparatus 40 of the present embodiment, holding section 48 for holding spring 42 is a projection portion. Holding section 48 is support wall portion 46 forming a bottom portion of hole portion 45, and is a projection portion protruding rearward from a substantially central portion of hole portion 45. Holding section 48 is inserted or press-fitted into the other end portion of spring 42 to hold spring 42.

As described above, the second embodiment has configurations similar to those of the first embodiment such as the position of spring 42 being regulated by holding section 48 in at least the predetermined direction which is the operating direction of base section 17 and clearance CL between contact section 43 and wall portion 47a being substantially equal between the one side and the other side in the predetermined direction. Accordingly, moderation feeling adding apparatus 40 can be easily assembled, a favorable moderation feeling can be added, and thus, the same operation and effect as those of the first embodiment can be obtained.

Further, since holding section 48 is formed of a projection portion, the position of spring 42 can be regulated even when the periphery of holding section 48, particularly entire hole portion 45, is formed widely, and thus, spring 42 and contact section 43 can be more easily assembled.

In addition, in each of the above-described embodiments, limiting section 47b may be set so that both limiting sections 47b and 47b are always in contact with contact section 43.

Limiting section 47b is not limited to a planar shape, and may have unevenness as long as the shape can limit the movable range of contact section 43.

Moreover, base section 17 as the operation section is integrally configured with operated section 6, but the present invention is not limited to this, and base section 17 may have any one as long as it is operated to the one side and the other side in the predetermined direction in conjunction with the operation of operated section 6.

Further, the operation section may have a rotation shaft in the right-left direction or the up-down direction. In this case, spring 42 and contact section 43, that is, plunger 44 can be operated in the same manner as in each of the above-described embodiments by arranging them in the direction parallel to the rotation shaft.

Further, the operation section is not limited to a rotating section as long as it can be operated to the one side and the other side in a predetermined direction, and may be a reciprocating section.

Operation apparatus 5 sets the operation of fin 4 of wind direction adjusting apparatus 1, but operation apparatus 5 is not limited to this, and may set the operation of any apparatus.

Operation apparatus 5 is not limited to operating another apparatus as long as operated section 6 is operated by the user.

Further, the operation section is in conjunction with the operation of operated section 6, but the present invention is not limited to this, and may be applied to any operation section that operates on the one side and the other side in a predetermined direction.

That is, moderation feeling adding apparatus 40 can be applied to any apparatus including spring 42 and contact section 43 (plunger 44), base section 17 (operation section), wall portion 47a, limiting section 47b, and holding section 48.

INDUSTRIAL APPLICABILITY

The present invention can be suitably used, for example, as an apparatus for adding a moderation feeling to an operated section for operating a wind direction adjusting apparatus for air conditioning of an automobile.

REFERENCE SIGNS LIST

17 Base section that is operation section
40 Moderation feeling adding apparatus
42 Spring
43 Contact section
45 Hole portion
47a Wall portion
47b Limiting section
48 Holding section
20 CL Clearance

What is claimed is:
1. A moderation feeling adding apparatus comprising:
an operation section that operates to one side and the other side in a predetermined direction;
a spring;
a contact section that is attached to the spring and capable of being in contact with the operation section;
a holding section that holds the spring;
a wall portion that faces the contact section in the predetermined direction and generates a sound which becomes a moderation feeling by a collision between the wall portion and the contact section moved by a biasing force of the spring as a contact state between the contact section and the operation section changes due to an operation of the operation section; and a limiting section that limits a movable range of the contact section to a range along the predetermined direction, wherein the holding section regulates a position of the spring at least in the predetermined direction, and a clearance between the contact section and the wall portion is substantially equal between the one side and the other side in the predetermined direction.

2. The moderation feeling adding apparatus according to claim 1, wherein the wall portion is a portion of a side wall of a hole portion in which the spring and the contact section are arranged, and the holding section holds the spring in a substantially central portion of the hole portion.

3. The moderation feeling adding apparatus according to claim 1, wherein the holding section is a recessed portion into which an end portion of the spring is inserted.

4. The moderation feeling adding apparatus according to claim 3, wherein an opening side of the recessed portion is widened in a tapered shape toward a wall portion side.

5. The moderation feeling adding apparatus according to claim 2, wherein the holding section is a recessed portion into which an end portion of the spring is inserted.

6. The moderation feeling adding apparatus according to claim 5, wherein an opening side of the recessed portion is widened in a tapered shape toward a wall portion side.

* * * * *